US009866930B2

(12) United States Patent
Furusawa et al.

(10) Patent No.: US 9,866,930 B2
(45) Date of Patent: Jan. 9, 2018

(54) STATION SIDE TERMINAL DEVICE, SUBSCRIBER SIDE TERMINAL DEVICE, OPTICAL COMMUNICATION SYSTEM, ROUTE SWITCHING METHOD, NON-TRANSITORY COMPUTER READABLE MEDIUM STORING ROUTE SWITCHING PROGRAM, AND WAVELENGTH SWITCHING METHOD

(71) Applicant: Oki Electric Industry Co., Ltd., Tokyo (JP)

(72) Inventors: Satoshi Furusawa, Tokyo (JP); Toshiaki Mukojima, Tokyo (JP); Akiya Suzuki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/222,315

(22) Filed: Jul. 28, 2016

(65) Prior Publication Data

US 2017/0055052 A1    Feb. 23, 2017

(30) Foreign Application Priority Data

Aug. 21, 2015  (JP) .................................. 2015-164152

(51) Int. Cl.
| H04Q 11/00 | (2006.01) |
| H04J 14/02 | (2006.01) |
| H04J 14/08 | (2006.01) |

(52) U.S. Cl.
CPC .......... H04Q 11/0062 (2013.01); H04J 14/02 (2013.01); H04J 14/08 (2013.01);
(Continued)

(58) Field of Classification Search
None
See application file for complete search history.

(56) References Cited

U.S. PATENT DOCUMENTS

| 7,738,490 B2* | 6/2010 | Kim ..................... H04L 12/1877 370/468 |
| 8,665,724 B2* | 3/2014 | Stanwood ........... H04L 47/2458 370/235 |

(Continued)

FOREIGN PATENT DOCUMENTS

| JP | H10-229404 A | 8/1998 |
| JP | 2011-055407 A | 3/2011 |

OTHER PUBLICATIONS

IEEE Standard for Information technology—Local and metropolitan area networks—Specific requirements "Part 3: Carrier Sense Multiple Access with Collision Detection (CSMA/CD) Access Method and Physical Layer Specifications Amendment 1: Physical Layer Specifications and Management Parameters for 10 Gb/s Passive Optical Networks," IEEE Std 802.3av-2009 (Amendment to IEEE Std 802.3-2008), pp. 1-214, Oct. 30, 2009.

(Continued)

Primary Examiner — Darren E Wolf
(74) Attorney, Agent, or Firm — Rabin & Berdo, P.C.

(57) ABSTRACT

The station side terminal device of the present disclosure includes: plural terminal devices, each including a buffer section including a through queue and one or more switch queues that temporarily stores packets, and a subscriber side terminal device assignment section that causes unicast packets addressed to switching target subscriber side terminal devices and packets for switching targets that are addressed to all of the subscriber side terminal devices to be stored in a switch queue, and causes unicast packets addressed to non-switching target subscriber side terminal devices and packets for non-switching targets addressed to all of the subscriber side terminal devices to be stored in the through queue; and a terminal device assignment section that transmits obtained unicast packets and obtained packets
(Continued)

addressed to all of the subscriber side terminal devices to the terminal device designated by the packets.

11 Claims, 6 Drawing Sheets

(52) U.S. Cl.
CPC . *H04Q 11/0005* (2013.01); *H04Q 2011/0016* (2013.01); *H04Q 2011/0073* (2013.01); *H04Q 2011/0086* (2013.01)

(56) References Cited

U.S. PATENT DOCUMENTS

| | | | | |
|---|---|---|---|---|
| 8,824,287 | B2* | 9/2014 | Carlstrom | H04L 47/10 |
| | | | | 370/230.1 |
| 8,824,899 | B2* | 9/2014 | Yamashita | H04J 3/1694 |
| | | | | 398/1 |
| 8,948,595 | B2* | 2/2015 | Kazawa | H04B 10/27 |
| | | | | 398/154 |
| 8,989,009 | B2* | 3/2015 | Xiong | H04L 49/357 |
| | | | | 370/218 |
| 2013/0201831 | A1* | 8/2013 | Tal | H04L 47/625 |
| | | | | 370/235 |

OTHER PUBLICATIONS

International Telecommunication Union Telecommunication Standardization Sector: Study Period 2013-2016, Study Group 15: TD 200 Rev.1 (PLEN/15), "Draft new Recommendation ITU-T G.989.3 (for Consent, Apr. 4, 2014)", pp. 1-164, Mar. 24-Apr. 4, 2014.

* cited by examiner

STATION SIDE TERMINAL DEVICE, SUBSCRIBER SIDE TERMINAL DEVICE, OPTICAL COMMUNICATION SYSTEM, ROUTE SWITCHING METHOD, NON-TRANSITORY COMPUTER READABLE MEDIUM STORING ROUTE SWITCHING PROGRAM, AND WAVELENGTH SWITCHING METHOD

CROSS-REFERENCE TO RELATED APPLICATION

This application claims priority under 35 USC 119 from Japanese Patent Application No. 2015-164152, filed on Aug. 21, 2015, the disclosure of which is incorporated by reference herein.

BACKGROUND

Technical Field

The present disclosure relates to a station side terminal device, a subscriber side terminal device, an optical communication system, a route switching method, a non-transitory computer readable medium storing a route switching program, and a wavelength switching method.

Related Art

Recently, a service known as fiber to the home (FTTH), which utilizes optical fiber as a transmission path, has come to be widely used with the objective of providing high speed, high bandwidth broadband services to general individual residences. Optical access networks known as passive optical networks (PON) are widely employed when providing broadband services by FTTH.

PON is configured by making a one-to-many connection between a single station side terminal device (an optical line terminal (OLT)) and plural subscriber side terminal devices (optical network units (ONU)) by splitting a single optical cable using passive optical elements known as optical splitters (optical couplers). PONs enable FTTH services to be provided economically by sharing an optical fiber, an OLT, and the like between plural subscribers.

Examples of PONs include what is known as a 10 Gigabit Ethernet (registered trademark) PON (10G-EPON) (for example, see IEEE (Institute of Electrical and Electronics Engineers) Std 802.3av-2009 (referred to as Document 1 hereafter)). In the PON described in Document 1, time division multiple access (TDMA) technology is employed in communication from ONUs to the OLT (upstream communication), and conflicts between signals from respective ONUs are avoided. PONs that employ such TDMA technology are known as TDM-PONs.

Moreover, to respond to increasing demand for communication over optical access networks, as next generation PONs having transmission rates exceeding 10 Gbps, research and development related to WDM/TDM-PONs (TWDM-PONs) is advancing in which plural TDM-PONs are configured on a single PON infrastructure using wavelength division multiplexing (WDM) technology (for example, see Japanese Patent Application Laid-Open (JP-A) No. 2011-055407). The transmission capacity of PON infrastructure may be increased by employing a TWDM-PON.

FIG. 6 illustrates a schematic diagram of the TWDM-PON disclosed by JP-A No. 2011-055407. As illustrated in FIG. 6, the TWDM-PON 1 is configured including an OLT 2 and plural ONUs: ONU 6-1 to ONU 6-$m$ (where m is an integer of 2 or more). The OLT 2 is configured including a control device 3 that controls the TWDM-PON 1, plural optical subscriber units (OSUs) 4 (4-1 to 4-$n$, where n is an integer of 2 or more), and plural optical transceivers 5 (5-1 to 5-$n$) that are each connected to the respective OSUs 4. The optical transceivers 5 are each connected to the plural ONUs 6 through an optical splitter 7.

The optical transceivers 5 of the OLT 2 are each allocated a respective fixed reception wavelength for upstream communication so that reception wavelengths of the respective optical transceivers 5 of the OLT 2 do not overlap with one another. In such cases, respective connections between the optical transceivers 5 of the OLT 2 and the ONUs 6 can be dynamically switched by changing the transmission wavelengths of optical transceivers (not illustrated in the drawings) of the ONUs 6. The optical transceivers 5 of the OLT 2 are also each allocated with a respective fixed transmission wavelength for communication from the OLT 2 to the ONUs 6 (downstream communication). Similarly to upstream communication, and respective connections between the optical transceivers 5 of the OLT 2 and the ONUs 6 can be dynamically switched by changing the reception wavelength of optical transceivers of the ONUs 6. Accordingly, not only is bandwidth increased in the TWDM-PON 1, but merits thereof also include distribution of load according to variation in traffic, increased reliability due to route switching in the event of a failure, and reduced power consumption due to optical transceivers and device circuits sleeping in the event of low loads.

When dynamically switching connections between the OLT 2 and the ONUs 6 for downstream communication in the TWDM-PON 1, for example, switching of the optical transceivers 5 of the OLT 2 and switching of the reception wavelengths of the ONUs 6 are performed. Downstream communication packets (also simply referred to as "downstream packets" hereafter) cannot be received by an ONU 6 during a switching time over which the reception wavelength of the ONU 6 is being switched from a pre-switch wavelength to a post-switch wavelength. However, in multimedia applications and the like, in terms of service quality, it is preferable for no packet loss to arise during the switching time, there is accordingly demand for a switching process without any disconnection.

Accordingly, packets addressed to an ONU 6 targeted for switching need to be buffered in the OLT 2 during the switching time to avoid downstream communication packet loss during the switching time. For switching communication routes while buffering inputted packets, technology has been proposed in which a buffer is provided at an earlier stage than the switch that switches the route, and the route is switched by the switch according to the address of the inputted packets (for example, see JP-A No. H10-229404).

On the other hand, "Draft new Recommendation ITU-T (International Telecommunication Union Telecommunication Standardization Sector) G989.3 (for Consent, 4 Apr. 2014)" (referred to as Document 2 hereafter) discloses a wavelength switching sequence that is a procedure for dynamically changing transmission and reception wavelengths of the ONUs 6 in a TWDM-PON system like that described above.

More specifically, a procedure such as the following is executed. Namely, hereinbelow, in FIG. 6, a case in which the wavelength of the optical transceiver 5-1 connected to the OSU 4-1 is $\lambda 1$, the wavelength of the optical transceiver 5-2 connected to the OSU 4-2 is $\lambda 2$, the wavelength of the optical transceiver of the ONU 6-1 is designated as $\lambda 1$, and the ONU 6-1 is changed from a state of being connected to the OSU 4-1 to being connected to the OSU 4-2, will be described.

When the above case is performed, the OLT 2 transmits a wavelength switching control message to the ONU 6-1 via the OSU 4-1, containing an instruction to switch wavelength to λ2. Having received the wavelength switching control message, the ONU 6-1 responds to the OSU 4-1 with a wavelength switching response message, and changes the wavelength of its own optical transceiver to λ2. After the wavelength change has completed, the ONU 6-1 transmits a wavelength switching completion message to the OSU 4-2, and having received the wavelength switching completion message, the OLT 2 recognizes that the wavelength switching of the ONU 6-1 has completed. Then, the OLT 2 switches the output route for downstream traffic addressed to the ONU 6-1 from the OSU 4-1 to the OSU 4-2 in the control device 3, and re-starts transmission of signals for the ONU 6-1.

In this TWDM-PON, the OLT identifies the downstream packets by ONU unit, and assigns the packets to the optical transceiver allocated with the transmission wavelength corresponding to the reception wavelength of the ONU at that point in time.

When the configuration described in JP-A No. H10-229404, mentioned above, is applied in order to perform route switching without disconnection in the TWDM-PON, there is a need to install, at an earlier stage than the switch, as many buffers as there are ONUs accommodated by the TWDM-PON. The circuit scale accordingly increases when there are many ONUs accommodated therein. Moreover, since capacity sufficient to hold the packets during the switching time is needed in each of the buffers, a large buffer size is needed when the switching takes a long time. Increases in the circuit scale and buffer size may lead to issues in device implementation.

Moreover, when a shared buffer system in which a buffer is shared is applied, address management information increases as the number of accommodated ONUs increases. A large amount of memory is therefore needed to address management when there are many accommodated ONUs, which may lead to an issue in device implementation.

Broadband services provided to general individual residences also include distributable broadcast services, and there is a need to be able to implement wavelength switching operations without causing service quality degradation, such as packet loss, during provision of broadcast services.

Ultra-high-definition video on demand (VOD) 4K video delivery services, which have started operation in recent years, are examples of such broadcast services, and hereafter the provision of, for example, 4K video broadcast delivery services that utilize the high bandwidth capabilities of TWDM-PON systems is expected. For example, a video delivery service is conceivable in which, when broadcasting multichannel 4K video, ch1 to ch100 are distributed using wavelength λ1, ch101 to ch200 are distributed using wavelength λ2, and video is received by selecting which wavelength and channel to receive at the ONU side.

However, in a TWDM-PON system that provides such a 4K video delivery service, when, for example, there has been a request to view ch101 from a subscriber under an ONU at wavelength λ1, in the wavelength switching sequence described in Document 2, wavelength switching control is made by control from the OLT at the discretion of the OLT. Thus wavelength switching cannot be implemented by the ONU, and the desired channel cannot be viewed. Moreover, when wavelength switching is freely implemented by the ONU, services other than the video delivery service are cut off, such as internet data communication received up to that point.

SUMMARY

The present disclosure provides an OLT that may dynamically change connections to ONUs without causing packet loss even in a case in which a large number of ONUs are accommodated, and a route switching method that may change connections between ONUs and the OLT, without causing an increase in circuit scale. The present disclosure also provides an OLT that may dynamically change connections to ONUs, and a route switching method that may change connections between ONUs and the OLT, without causing packet loss even in a case in which a broadcast service is being provided. The present disclosure also realizes an ONU, a TWDM-PON system, and a wavelength switching method that may implement wavelength switching at the discretion of an ONU based a request from the ONU, in addition to conventional wavelength switching at the discretion of an OLT by control from the OLT.

A first aspect of the present disclosure is a station side terminal device comprising: terminal devices each including: a buffer section including a through queue and one or more switch queues that temporarily store the packets; a subscriber side terminal device assignment section that, in cases in which route switching has occurred in a communication route that connects the station side terminal device and subscriber side terminal devices, causes unicast packets addressed to switching target subscriber side terminal devices and packets for switching targets that are addressed to all of the subscriber side terminal devices to be stored in a switch queue, and causes unicast packets addressed to non-switching target subscriber side terminal devices and packets for non-switching targets that are addressed to all of the subscriber side terminal devices to be stored in the through queue; and a scheduler that reads packets that have been stored in the buffer section, and outputs the read packets to the connected subscriber side terminal device; and a terminal device assignment section that transmits the unicast packets, which are obtained from a higher level communication network to which the station side terminal device is connected, to a terminal device in which a subscriber side terminal device is registered as a destination of the unicast packets, and copies the packets addressed to all of the subscriber side terminal devices obtained from the higher level communication network and transmits the copied packets to one or more designated terminal devices.

A second aspect of the present disclosure is a route switching method that, in the station side terminal device of claim 1, changes a registration location for the switching target subscriber side terminal devices from a pre-switching terminal device to a post-switching terminal device, the route switching method including: changing, by the terminal device assignment section, a transmit destination of the unicast packets addressed to the switching target subscriber side terminal devices from the pre-switching terminal device to the post-switching terminal device; referencing, by the subscriber side terminal device assignment section provided at the post-switching terminal device, a learning table, and, in cases in which the switch queue has been learned for the unicast packets addressed to the switching target subscriber side terminal devices, storing the unicast packets addressed to the switching target subscriber side terminal devices in the learned switch queue, in cases in which the switch queue has not been learned for the unicast packets addressed to the switching target subscriber side terminal devices, storing the unicast packets addressed to the switching target subscriber side terminal devices in one of non-used switch queues, and registering the one of the switch queues in the learning table, in cases in which the switch queue has been learned for the packets for switching targets that are addressed to all of the subscriber side terminal devices, storing the packets for switching targets that are addressed to all of the subscriber side terminal devices in the learned switch queue, and in cases in which the switch queue has not been learned for the packets for switching targets that are addressed to all of the subscriber side terminal devices, storing the packets for switching targets that are addressed to all of the subscriber side terminal devices in one of the non-used switch queues and registering the one of the switch queues in the learning table; referencing, by the subscriber side terminal device assignment section provided at the pre-switching terminal device, a learning table, and in cases in which the switch queue has been learned for the packets for switching targets that are addressed to all of the subscriber side terminal devices, storing the packets for switching targets that are addressed to all of the subscriber side terminal devices in the learned switch queue, and in cases in which the switch queue has not been learned for the packets for switching targets that are addressed to all of the subscriber side terminal devices, storing the packets for switching targets that are addressed to all of the subscriber side terminal devices in one of the non-used switch queues and registering the one of the switch queues in the learning table; after a number of the packets addressed to the switching target subscriber side terminal devices stored in the pre-switching terminal device becomes zero, starting, by the post-switching terminal device, transmission of packets addressed to the switching target subscriber side terminal devices, and starting transmission of the packets for switching targets that are addressed to all of the subscriber side terminal devices, and starting, by the pre-switching terminal device, transmission of the packets for switching targets that are addressed to all of the subscriber side terminal devices; after a number of the unicast packets addressed to the switching target subscriber side terminal devices stored in the switch queue of the post-switching terminal device becomes zero, disassociating the switch queue for the unicast packets addressed to the switching target subscriber side terminal devices from the learning table, and transmitting the unicast packets addressed to the switching target subscriber side terminal devices via the through queue; and after a number of the packets for switching targets that are addressed to all of the subscriber side terminal devices stored in the switch queue of the post-switching terminal device becomes zero, disassociating the switch queue for the packets for switching targets that are addressed to all of the subscriber side terminal devices from the learning table, and transmitting the packets for switching targets that are addressed to all of the subscriber side terminal devices via the through queue.

A third aspect of the present disclosure is a non-transitory computer readable medium storing a route switching program that causes a computer to execute each step of the route switching method of the second aspect.

A fourth aspect of the present disclosure is a subscriber side terminal device, connected to any of the plural terminal devices in the station side terminal device of the first aspect, which allocates respective wavelengths for configuring the communication route through an optical fiber transmission path and provides a specific service using the allocated wavelength, the subscriber side terminal device relaying a service to a user terminal according to a wavelength of the connected terminal device by using packets received through the communication route, the subscriber side terminal device including: a specifying section that receives a request for the service from the user terminal, and that specifies a wavelength allocated to the received service; a transmitter that, in cases in which the wavelength specified by the specifying section requires a change in wavelength, transmits a wavelength switching request message requesting a switch in wavelength to the connected terminal device; and a receiver configured to switch a wavelength to be received through the communication route.

A fifth aspect of the present disclosure is an optical communication system, including: the station side terminal device of the first aspect; an optical splitter connected to the station side terminal device by an optical fiber transmission path; and plural the subscriber side terminal devices of the fourth aspect, each connected to plural optical fiber transmission paths that are connected to the optical splitter.

A sixth aspect of the present disclosure is a wavelength switching method, for the optical communication system of fifth aspect in which the station side terminal device further includes a station side terminal device controller, of changing a wavelength of a switching target subscriber side terminal device that has transmitted the wavelength switching request message, from a wavelength allocated to a pre-wavelength switching terminal device to a wavelength allocated to a post-wavelength switching terminal device, the wavelength switching method including: transmitting, by the station side terminal device controller, a wavelength switching instruction message to a pre-wavelength switching terminal device and to a post-wavelength switching terminal device, in cases in which the pre-wavelength switching terminal device has received the wavelength switching request message; transmitting, by a pre-switching terminal device that has received the wavelength switching instruction message from the station side terminal device controller, a wavelength switching control message to a switching target subscriber side terminal device; transmitting, by the switching target subscriber side terminal device that has received the wavelength switching control message, a first wavelength switching completion message to the post-wavelength switching terminal device after the wavelength of the receiver has been switched; transmitting, by the station side terminal device controller, a first switch completion message to the pre-wavelength switching terminal device and to the post-wavelength switching terminal device, in cases in which the post-wavelength switching terminal device has received the first wavelength switching completion message; transmitting, by the post-wavelength switching terminal device that has received the first switch completion message, a second wavelength switching completion message to the switching target subscriber side terminal device; and transmitting, by the switching target subscriber side terminal device that has received the second wavelength switching completion message, a second switch completion message to the user terminal.

In the OLT and the route switching method according to the present disclosure, the number of ONUs simultaneously performing switching processing is limited, and the number of switch queues that hold packets during switching processing may be less than the number of accommodated ONUs. As a result, since the number of queues is reduced, the amount of memory needed for managing buffer addresses may also be reduced. This may enable economic provision of an OLT that may dynamically change connections to ONUs without causing packet loss, namely, an OLT that may switch without any disconnection, even in a case in which a large number of ONUs are accommodated, and may enable a route switching method that may dynamically change connections between ONUs and the OLT.

The OLT and the route switching method according to the present disclosure may also enable provision of an OLT that may dynamically change connections between ONUs, and a route switching method that may change connections between ONUs and the OLT, without causing packet loss even in a case in which a broadcast service is being provided.

Namely, in the OLT and the route switching method according to the present disclosure, in a case in which ONU route switching is being performed, broadcast packets to be transmitted to both a pre-switch OSU and a post-switch OSU are stored in a switch queue. Further, after the switch has completed, transmission of the stored packets are started. Accordingly, for example, a new video channel distributed by the post-switch OSU may be newly provided, while continuously (without disconnection) providing video channels distributed by the pre-switch OSU and the post-switch OSU. In a case in which this is performed, buffers may be utilized effectively since packets other than broadcast packets to be transmitted to both the pre-switch OSU and the post-switch OSU do not store in the switch queue.

The ONU, the optical communication system, and the wavelength switching method of the present disclosure may enable wavelength switching to be implemented at the discretion of an ONU by a request from the ONU in a TWDM-PON system.

BRIEF DESCRIPTION OF DRAWINGS

Exemplary embodiments will be described in detail based on the following figures, wherein.

DETAILED DESCRIPTION

Explanation follows regarding an exemplary embodiment of the present disclosure, with reference to the drawings. However, the drawings are merely schematically illustrated to an extent that enables understanding of the present disclosure. Explanation is also given regarding a preferable configuration of the present disclosure; however, numerical conditions and the like are merely preferable examples. Accordingly, the present disclosure is not limited to the exemplary embodiment described below, and many modifications and changes may be made to achieve the functions of the present disclosure without departing from the scope of the configuration of the present disclosure.

Figure 1:
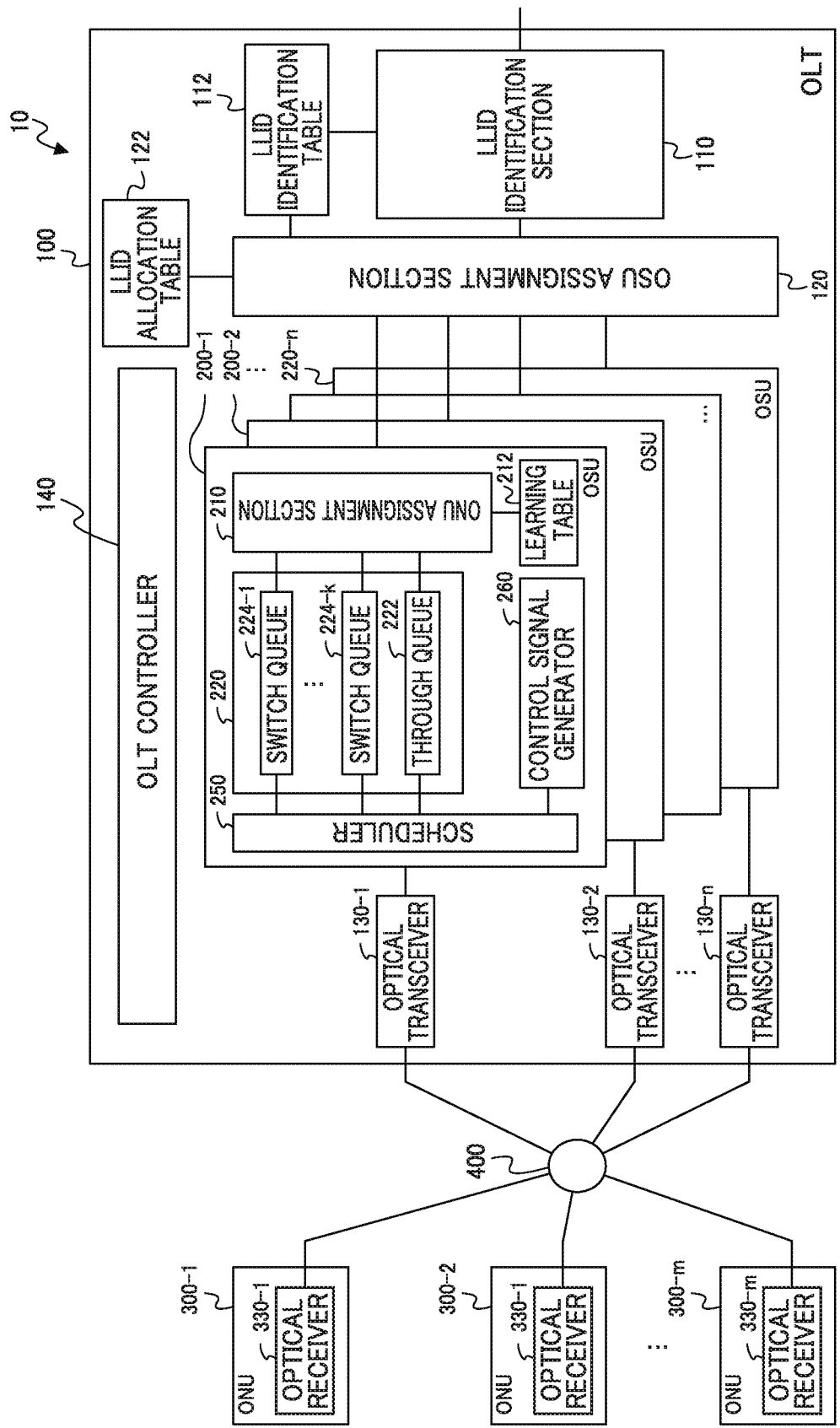
FIG. 1 is a diagram of relevant configuration of a TWDM-PON for explaining a route switching method according to an exemplary embodiment.

Explanation follows regarding an example of a configuration of a TWDM-PON provided with an OLT and ONUs according to an exemplary embodiment, with reference to FIG. 1. FIG. 1 is a configuration diagram of the TWDM-PON for explaining a route switching method according to the present exemplary embodiment, described below.

The TWDM-PON is an optical access network employing a PON system. In the TWDM-PON (optical communication system), downstream signals from the OLT (station side terminal device) to the ONUs (subscriber side terminal devices), and upstream signals from the ONUs to the OLT, are transmitted and received. The upstream signals and downstream signals also include data signals transmitted and received between a higher level network (not illustrated in the drawings) to which the OLT is connected and user terminals or the like (see FIG. 4) to which the ONUs are connected, and control signals for establishing PON links. Herein, explanation follows relating to data signals included in the downstream signals (downstream packets), and explanations relating to the upstream signals and control signals included in the downstream signals may be sometimes omitted.

A TWDM-PON 10 includes a single OLT 100, plural ONUs 300-1 to 300-$m$ (where m is an integer of 2 or more), and an optical splitter 400 that is a passive optical element. Respective optical fibers connect the OLT 100 to the optical splitter 400, and connect the ONUs 300-1 to 300-$m$ to the optical splitter 400.

The OLT 100 is configured including an LLID identification section 110, an OSU assignment section (terminal device assignment section) 120, plural OSUs (terminal devices) 200-1 to 200-$n$ (where n is an integer of 2 or more), plural optical transmitters 130-1 to 130-$n$, and an OLT controller (station side terminal device controller) 140.

The LLID identification section 110 is connected to the OSU assignment section 120. The LLID identification section 110 identifies the addressed ONU based on identification information of the downstream packets input from the higher level network. For example, a VLAN ID (VID) included in Ethernet (registered trademark) packets (frames) may be employed as the identification information of the downstream packets. The LLID identification section 110 includes an LLID identification table 112 in which VIDs are associated with logical link identifiers (LLIDs). LLIDs are essentially allocated one-to-one to connected ONUs when downstream packets are unicast packets addressed to a specific ONU. The LLID identification section 110 can therefore use the LLID identification table 112 to identify the addressed ONU 300 from the VID of the unicast packet. The LLID identification section 110 appends the LLID allocated to the addressed ONU 300 to the unicast packets for transmit to the OSU assignment section 120.

However, when the downstream packets are broadcast packets addressed to all ONUs (packets addressed to all of the subscriber side terminal devices), the downstream packets have, for example, a specific VID associated with a broadcast service. The LLID identification section 110 can identify any downstream packets having that VID as broadcast packets. The LLID identification table 112 is provided with information for specific VIDs associated with broadcast services that identifies one or more OSUs to which the broadcast packets are to be transmitted. The LLID identification section 110 appends the broadcast LLID (BC-LLID) to the broadcast packets for transmission to the OSU assignment section 120.

The OSU assignment section 120 is connected to the plural OSUs 200-1 to 200-$n$. In the TWDM-PON 10, each of the ONUs 300-1 to 300-$m$ is registered to one out of the plural OSUs 200-1 to 200-$n$. The OSU assignment section 120 is provided with an LLID allocation table 122 that associates LLIDs with OSUs. The OSU assignment section 120 uses the LLID allocation table 122 to identify the OSU 200 to which the addressed ONU 300 is registered from the LLID of obtained downstream packets. The OSU assignment section 120 transmits unicast packets to the identified OSU 200. Moreover, when the obtained packets are appended with a BC-LLID, the OSU assignment section 120 recognizes that packets as a broadcast packets. Then, the OSU assignment section 120 references the LLID identification table 112 using the VID of the obtained broadcast packets, and transmits respective copies of the obtained broadcast packets to one or more designated OSUs 200-1 to 200-n.

The OSUs 200-1 to 200-n are one-to-one connected to the optical transmitters 130-1 to 130-n. Moreover, different fixed wavelength (λ1 to λn) are respectively allocated to each of the optical transmitters 130-1 to 130-n. The optical transmitters 130-1 to 130-n are connected to the ONUs 300-1 to 300-m via the optical splitter 400.

Downstream packets input to the OSUs 200 are transmitted to the addressed ONU 300 via the optical transmitter 130 connected to the OSU 200, using the wavelength allocated to that optical transmitter 130. Since the OSUs 200-1 to 200-n are one-to-one connected to the optical transmitters 130-1 to 130-n, the transmission wavelengths of the downstream packets are determined by the OSU registered for the addressed ONU. Therefore, the wavelength allocated to the optical transmitter 130-1 to 130-n connected to a given OSU 200-1 to 200-n also represents the wavelength allocated the given OSU 200-1 to 200-n in the following explanation.

Each of the OSUs 200-1 to 200-n is configured including an ONU assignment section (a subscriber side terminal device assignment section) 210, a buffer section 220, a scheduler 250, and a control signal generator 260. The buffer section 220 includes a single through queue 222, and one or more switch queues 224-1 to 224-k (where k is an integer of 1 or more) in parallel. Note that the number of switch queues 224, k, corresponds to the number of route switches that can be performed simultaneously. It is therefore preferable to provide plural switch queues 224. However, making the number of switch queues 224, k, greater increases the circuit scale. The number of switch queues 224, k, is therefore preferably less than the number of ONUs 300 that can be registered by each of the OSUs 200, thereby suppressing an increase in circuit scale.

The ONU assignment section 210 transmits unicast packets addressed to a specific ONU to the through queue 222 or to the switch queues 224-1 to 224-k. When the ONU of the destination of the packets are non-switching targets, the packets are transmitted to the through queue 222. When the ONU of the destination of the packets are a switching target, the ONU assignment section 210 transmits the packets to one of the switch queues 224-1 to 224-k. The ONU assignment section 210 references a learning table 212 to determine which of the plural switch queues to transmit packets that are addressed to switching target ONU.

When the switching target ONU has not been learned, namely, when the identifier (LLID) of unicast packets addressed to the switching target ONU has not been registered in the learning table, the ONU assignment section 210 transmits the packets to one of the switch queues 224 that is not used. When doing so, the ONU assignment section 210 registers in the learning table 212 the switch queue 224 to which the packets were transmitted and the identifier of that packet, such that these are learned. When an identifier (LLID) of the unicast packets addressed to the switching target ONU has already been learned, the ONU assignment section 210 transmits the packets to the switch queue 224 that was registered in the learning table 212.

The ONU assignment section 210 transmits the all-ONU-addressed broadcast packets to the through queue 222 or to the switch queues 224-1 to 224-k. When the broadcast packets are the one for the non-switching targets, the packets are transmitted to the through queue 222. When the broadcast packets are the one for the switching target, the ONU assignment section 210 transmits the packets to one of the switch queues 224-1 to 224-k. The ONU assignment section 210 references the learning table 212 to determine which of the plural switch queues to transmit broadcast packets that are the switching target. Note that reference to "broadcast packets for the switching target" in explanation of processing related to the ONU assignment section 210 means broadcast packets to be transmitted to at least both the pre-switch OSU that accommodates the switching target ONU, and a post-switch OSU.

When the broadcast packets for the switching target has not been learned, namely, when the identifier of the broadcast packets for the switching target has not been registered in the learning table, the ONU assignment section 210 transmits the packets to one of the switch queues 224 that is not used. When doing so, the ONU assignment section 210 registers in the learning table 212 the switch queue 224 to which the packets was transmitted and the identifier of that packet, such that these are learned. When an identifier of the broadcast packets for the switching target has already been learned, the ONU assignment section 210 transmits the packets to the switch queue 224 that was registered in the learning table 212.

The control signal generator 260 generates control signals, such as gate packets, used to establish PON links. Instructions to switch the reception wavelength in an ONU can be issued using the control signals.

A transmission request is issued to the scheduler 250 when packets are input to the through queue 222 or the plural switch queues 224-1 to 224-k. The scheduler 250 regulates output according to transmission requests for downstream packets from each of the queues 222, 224-1 to 224-k and according to control signal transmission requests from the control signal generator 260, and transmits downstream signals to the respective ONUs 300 via the optical transmitters 130-1 to 130-n.

The OLT controller 140 controls the OLT 100 overall, and controls the OSUs 200 installed in the OLT 100. For example, the OLT controller 140 updates the LLID identification table 112 and the LLID allocation table 122. The OLT controller 140 also monitors traffic through the OLT 100, and determines the timing and content of route switching. The OLT controller 140 also monitors reading from the schedulers 250 of each of the OSUs 200.

Moreover, for each change of a registration location OSU of the switching target ONU, the OLT controller 140 removes the switching target ONU registration from the pre-switch OSU, registers the switching target ONU to the post-switch OSU, and notifies the switching target ONU of the post-switch OSU. Note that the notification may be a direct instruction issued by the OLT controller 140 to the OSUs, or the notification content may be appended to packets to be transmitted to each of the OSUs.

The ONU 300 includes an optical receiver 330 that receives downstream packets. The reception wavelength of the optical receiver is variable, and is set so as to enable reception of the downstream packets having the wavelength allocated to the registered OSU.

Configuration other than that described above may be configured similar to that of a known TWDM-PON.

Figure 2:
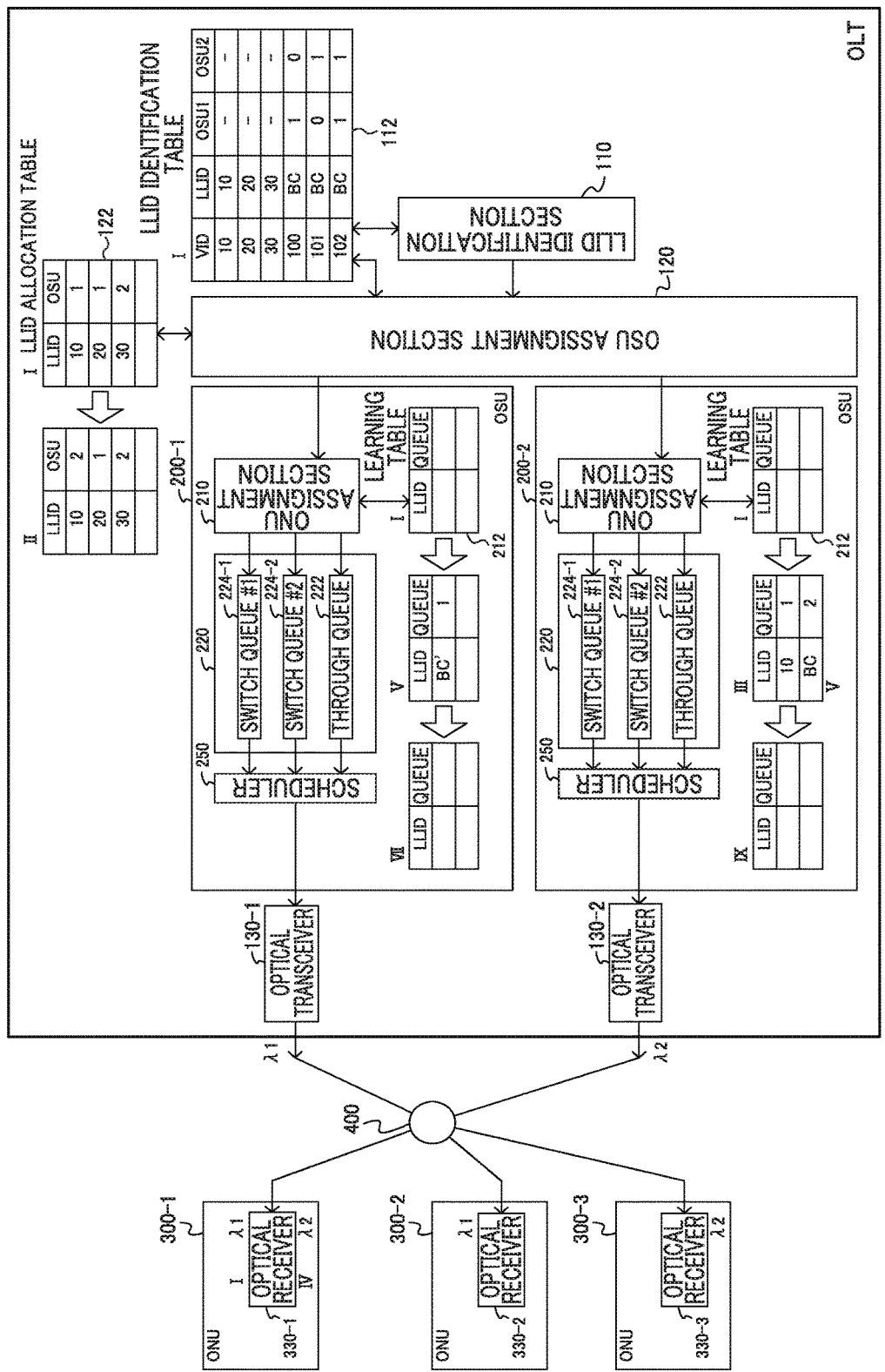
FIG. 2 is a schematic diagram for explaining a route switching method according to an exemplary embodiment.
Figure 3:
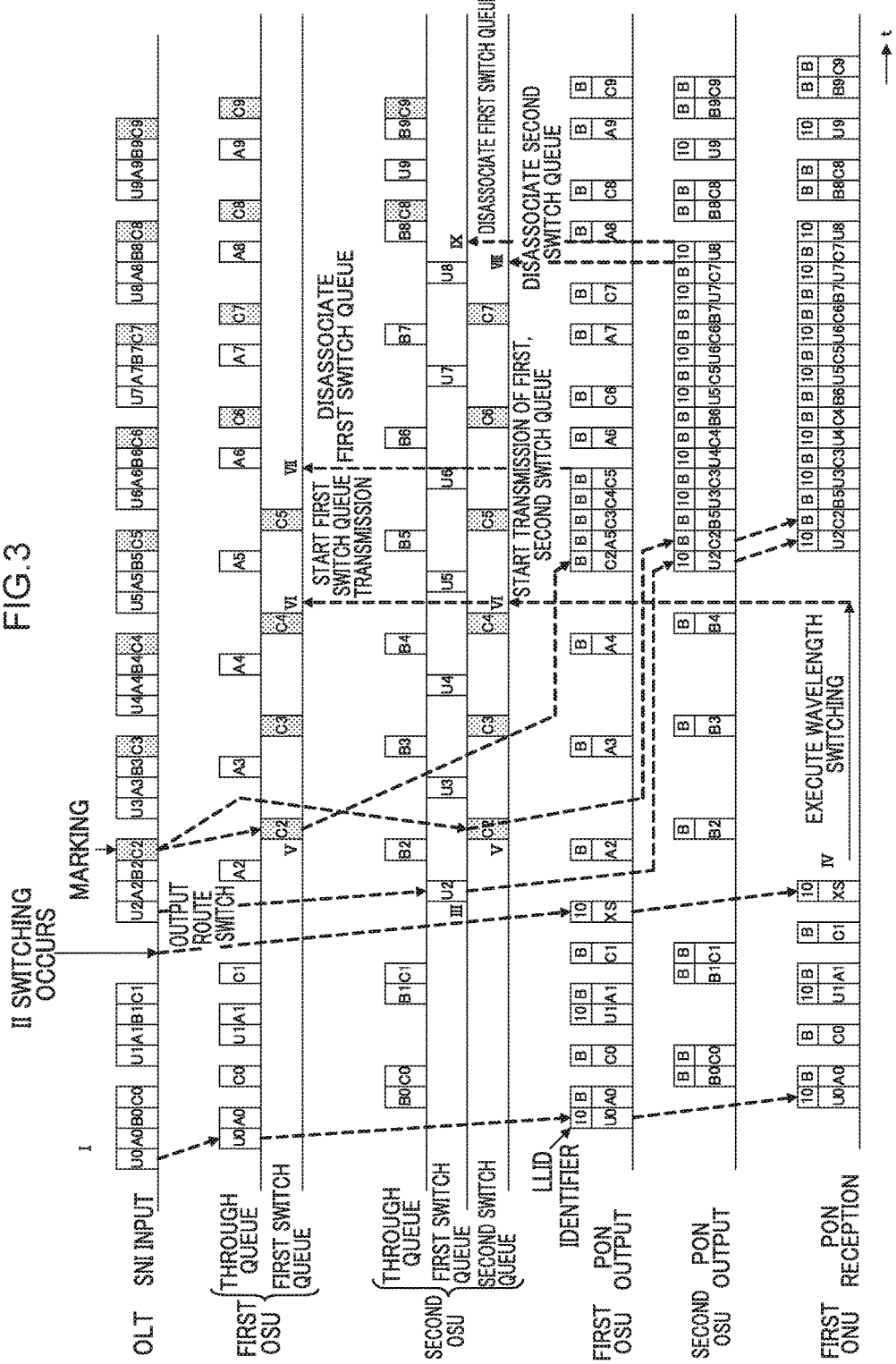
FIG. 3 is a timing chart for explaining a route switching method according to an exemplary embodiment.

Next, explanation follows regarding a route switching method according to the present exemplary embodiment, with reference to FIG. 2 and FIG. 3. FIG. 2 is a schematic diagram for explaining a route switching method according to the present exemplary embodiment, and illustrates a transition in contents of each table and each queue accompanying route switching. Therein, as an example, the LLID of a first ONU (the ONU 300-1) is denoted as 10, the LLID of a second ONU (the ONU 300-2) is denoted as 20, and the LLID of a third ONU (the ONU 300-3) is denoted as 30. Further, in the LLID identification table 112, VID=10 is allocated to LLID=10, VID=20 is allocated to LLID=20, and VID=30 is allocated to LLID=30, respectively. Moreover, VID=100, 101, and 102 are specific VIDs associated with broadcast services. Furthermore, broadcast packets with VID=100 are transmitted to the first OSU (OSU 200-1), broadcast packets with VID=101 are transmitted to the second OSU (OSU 200-2), and broadcast packets with VID=102 are transmitted to the first OSU and the second OSU.

FIG. 3 is a timing chart illustrating a flow leading up to the first ONU receiving downstream packets transmitted from a higher level network through a service node interface (SNI). Therein, unicast packets addressed to the first ONU are denoted U, broadcast packets with VID=100 are denoted A, broadcast packets with VID=101 are denoted B, and broadcast packets with VID=102 are denoted C. Note that "PON output" in FIG. 3 refers to optical output at the optical transmitters 130, and "PON reception" refers to optical reception at the optical receiver 330.

At moment I, the first ONU and the second ONU are registered to the first OSU. Moreover, the third ONU is registered to the second OSU. Namely, OSU=1 is allocated to LLID=10 and LLID=20 in the LLID allocation table 122. Moreover, OSU=2 is allocated to LLID=30. Accordingly, the OSU assignment section 120 transmits the packets U addressed to the first ONU to the first OSU. These packets are transmitted to the first ONU as downstream signals having wavelength λ1, via the through queue, the scheduler, and the optical transmitter 130-1 of the first OSU.

The OSU assignment section 120 transmits the broadcast packets A to the first OSU, and transmits the broadcast packets B to the second OSU. Moreover, the OSU assignment section 120 transmits respective copies of the broadcast packets C to the first OSU and the second OSU. The broadcast packets are transmitted using the respective wavelengths allocated to the first OSU and the second OSU, via the respective through queues, the schedulers, and the optical transmitters 130-1 and 130-2 of the first OSU and the second OSU. Herein, the first OSU transmits the broadcast packets A and C to the first ONU and the second ONU as downstream signals having wavelength λ1. Moreover, the second OSU transmits the broadcast packets B and C to the third ONU as downstream signals having wavelength λ2. Broadcast packets to be transmitted from the first OSU and the second OSU are copied by splitting at the optical splitter 400, and are transmitted to all ONUs. Copying of the packets in the optical splitter 400 is, for example, a single copy broadcast (SCB) as defined by 10G-EPON (see Document 1). The first ONU, the second ONU, and the third ONU receive broadcast packets having wavelengths allocated to their respectively registered OSUs.

LLID identifiers are appended to packets to be transmitted from the first OSU and the second OSU. Each ONU 300 (the first ONU, the second ONU, and the third ONU) determines whether or not received packets are addressed to itself based on the LLID identifier of the packet. In the example of FIG. 3, LLID identifier=10 is appended to the packets U addressed to the first ONU in accordance with the LLIDs allocated to each ONU 300. Moreover, LLID identifier=B, indicating that all ONUs 300 are addressed, is appended to the broadcast packets A, B, and C. Appending the LLID identifier to the packets is performed by, for example, an LLID identifier appending section, not illustrated in the drawings. In the example of FIG. 3, the LLID identifier is appended to the packets transmitted between the buffer section 220 and the scheduler 250. Note that, by appending the LLID identifier to packets at a later stage than the buffer section 220, increase in use of capacity in each of the queues by the LLID identifiers may be prevented.

In the present exemplary embodiment, the unicast packets addressed to the non-switching target ONUs are all output from the through queue 222. Accordingly, in cases in which the LLID identifier is appended at a later stage than the buffer section 220, the VIDs of the packets output from the through queue 222 need to be read by the LLID identifier appending section, and the LLID identifiers corresponding to these VIDs need to be appended to the packet.

In order to address this, LLID identifiers may be appended to the packets transmitted between the ONU assignment section 210 and the buffer section 220. In such cases, the LLID identifier appending section is provided at a later stage than the ONU assignment section 210. Then the LLID identifier appending section appends the LLID identifier to each packet based on the LLID referred to by the ONU assignment section 210 when each packet are assigned to a queue. The result is advantageous from the viewpoint of communication throughput since there is no need to re-read the LLID at a stage later than the buffer section 220.

As an example of route switching according to the present exemplary embodiment, a case is considered here in which the registration location of the first ONU is switched from the first OSU to the second OSU. This switch is performed with the objective of, for example, distributing communication load. In the example illustrated in FIG. 3, normal communication are performed in the TWDM-PON 10 from moment I until moment II, and switching occurs at moment II.

In this case, as illustrated in FIG. 2, at moment II, the OLT controller 140 updates the LLID allocation table 122 such that LLID=10 is allocated OSU=2. After the LLID allocation table 122 has been updated, packets addressed to the first ONU that have been transmitted from the higher level network to the OLT 100 are transmitted to the second OSU.

At this point in time, the first ONU cannot receive downstream signals using wavelength λ2 from the second OSU, since the reception wavelength of the first ONU is λ1. The first OSU therefore needs to instruct the first ONU to switch its reception wavelength to λ2. However, it is possible that packets addressed to the first ONU are stored in a non-transmitted state in the first OSU. Moreover, the first ONU sometimes takes time to switch its reception wavelength.

In consideration of the time required to switch the wavelength of the first ONU and the time until packets addressed to the first ONU stored in the first OSU are cleared, it is preferable to instruct the wavelength switch together with a timing thereof to the first ONU. This instruction is issued by transmitting control packets XS to the first ONU (see FIG. 3). The control packets XS includes notification of the wavelength switch, and information regarding the post-switch wavelength and the timing for the switch. The control packets XS are generated by the control signal generator 260 (see FIG. 1) based on instruction by the OLT controller 140.

From moment II onward, when the second OSU obtains packets addressed to the first ONU, the second OSU determines whether or not the first ONU is the switching target ONU. At moment II, when the LLID allocation table 122 is updated, the OLT controller 140 notifies the second OSU that the first ONU is the switching target ONU. The ONU assignment section 210 recognizes the first ONU as the switching target ONU based on the notification.

Then, at moment III, the ONU assignment section 210 of the second OSU determines whether the first ONU has been learned in the learning table 212, or has not been learned in the learning table 212. In this case, it is determined that the first ONU has not been learned since the first ONU is not registered in the learning table 212. The ONU assignment section 210 transmits packets that are addressed to the unlearned ONU, to one of the switch queues that are not used (non-used switch queues), and causes that switch queue to be learned in the learning table. In this case, the first switch queue is selected as the switch queue not used. It is sufficient for the selection of the switch queue to select any switch queue that is not used, and selection may be made in sequence of, for example, smallest number first, or selection may be made at random.

After the first switch queue has been selected, packets addressed to the first ONU are transmitted to the first switch queue, and, in the learning table 212, the LLID identifier 10 of the first ONU is registered in the LLID column, and 1 is registered in the queue column. As a result, the first ONU becomes learned (see FIG. 2). After the first ONU has been learned, the ONU assignment section 210 of the second OSU transmits packets addressed to the first ONU to the first switch queue based on referencing the learning table 212.

However, from moment II onward, broadcast packets to be transmitted to both the pre-switch OSU and the post-switch OSU are marked by the OSU assignment section 120 so as to be recognized as the broadcast packets for the switching target. In the example of FIG. 3, the broadcast packets C are the packets for the switching target, and packets from C2 onward are marked.

Then, at moment V, when marked broadcast packets for the switching target C2 are received, the ONU assignment section 210 of the first OSU, which is the switching pre-switch OSU, determines whether or not the identifier of the broadcast packets has been learned, or has not been learned, in the learning table 212. In this case, it is determined that the identifier of the broadcast packets have not been learned since the identifier of the broadcast packets are not registered in the learning table 212.

The ONU assignment section 210 of the first OSU transmits the marked broadcast packets for the switching target C2 to one of the switch queues that are not used, and causes the selected switch queue to be learned in the learning table. In this case, the first switch queue is selected as the switch queue that is not used. After the first switch queue has been selected, the marked broadcast packets for the switching targets C2 are transmitted to the first switch queue, and in the learning table 212, BC is registered in the LLID column and 1 is registered in the queue column (see FIG. 2). The identifier of the broadcast packets becomes learned as a result. After the identifier of the broadcast packets have been learned, the ONU assignment section 210 of the first OSU transmits the marked broadcast packets for the switching targets C to the first switch queue based on referencing the learning table 212. Broadcast packets A are transmitted to the through queue since they are the non-switching targets.

Moreover, at moment V, when the marked broadcast packets for the switching targets C2 are received, the ONU assignment section 210 of the second OSU, which is the post-switch OSU, determines whether or not the identifier of the broadcast packets have been learned, or has not been learned, in the learning table 212. In this case, it is determined that the identifier of the broadcast packets has not been learned since the identifier of the broadcast packets are not registered in the learning table 212. The ONU assignment section 210 transmits the marked broadcast packets for the switching targets C2 to one of the switch queues that are not used, and causes that switch queue to be learned in the learning table. In this case, a second switch queue is selected as the switch queue that is not used. After the second switch queue has been selected, the marked broadcast packets for the switching target C2 is transmitted to the second switch queue, and, in the learning table 212, BC is registered in the LLID column, and 2 is registered in the queue column (see FIG. 2). As a result, the identifier of the broadcast packets becomes learned.

After the identifier of the broadcast packets has been learned, the ONU assignment section 210 of the second OSU transmits the marked broadcast packets for the switching target C to the second switch queue based on referencing the learning table 212. The broadcast packets B are transmitted to the through queue since they are packets for the non-switching targets.

Switching of the reception wavelength is started for the first ONU at moment IV. The timing of the wavelength switching is regulated such that packets addressed to the first ONU stored in the first OSU will be cleared by moment IV. At moment VI, after the reception wavelength switching has been completed for the first ONU, a control signal, such as a gate signal, is transmitted from the second OSU toward the first ONU, and a response is received from the first ONU. A link is thereby established between the second OSU and the first ONU.

Subsequently, the scheduler 250 of the first OSU transmits the broadcast packets stored in the first switch queue to the second ONU. The scheduler 250 of the second OSU transmits unicast packets addressed to the first ONU stored in the first switch queue to the first ONU, and transmits broadcast packets stored in the second switch queue to the first ONU and the third ONU.

At moment VII, the broadcast packets stored in the first switch queue of the first OSU are cleared (transmission completes), and the learned entry is disassociated. Disassociating the learning entry may be performed by deleting the identifier BC and the first switch queue from the learning table (see FIG. 2).

Then, at moment VIII, the broadcast packets stored in the second switch queue of the second OSU are cleared (transmission completes), and the learning entry is disassociated. Disassociating the learning entry may be performed by deleting the identifier BC and the second switch queue from the learning table.

Then, at moment IX, the packets stored in the first switch queue of the second OSU are cleared (transmission completes), and the learning entry is disassociated. Disassociating the learning entry may be performed by deleting the identifier 10 of the packets addressed to the first ONU, and the first switch queue, from the learning table (see FIG. 2). Moreover, the first ONU is set as the non-switching targets.

At moment V, in cases in which the reception wavelength switching of the first ONU has already been completed and a link has been established between the second OSU and the first ONU, the broadcast packets for the switching targets are transmitted to the through queue, without performing processing to select and learn the switch queue for the broadcast packets for the switching targets in the first OSU and the second OSU, and without performing processing to store in the switch queue. The marking processing for the broadcast packets for the switching targets may be stopped from moment VIII onward, or may be continued until the next switch occurs.

FIG. 3 illustrates an example in which, from moment VI onward, the scheduler 250 of the second OSU sequentially reads packets from the first switch queue, the second switch queue, and the through queue. However, the scheduler 250 could, for example, be configured to prioritize the reading from the first and second switch queues. In such cases, learned entries may be disassociated early so that packets stored in the first switch queue are cleared more rapidly. Moreover, the scheduler 250 could also prioritize the reading from the through queue, rather than just the first switch queue. In such cases, the learned entries are disassociated early, and delays to packets in the through queue may be eliminated.

After the learning entry has been disassociated in the second OSU, and the first ONU has become the non-switching targets, packets addressed to the first ONU are transmitted to the optical transmitter 130-2 via the through queue and the scheduler 250 of the second OSU.

In the present exemplary embodiment, route switching can be performed by the above steps even in cases in which the registration location of the second ONU is simultaneously changed from the first OSU to the second OSU during route switching performed for the first ONU.

The OLT controller 140 according to the present exemplary embodiment takes into consideration the number of not-in-use switch queues, and limits the number of ONUs simultaneously performing wavelength switching to the number of not-in-use switch queues or less.

As described in detail above, in the OLT and route switching method according to the present exemplary embodiment, the number of ONUs simultaneously performing switching processing is limited, and the number of switch queues that hold packets during switching processing can be made less than the number of accommodated ONUs. Moreover, the amount of memory needed for buffer address management may be reduced since the number of queues is reduced. This may enable economic provision of an OLT that may switch without any disconnection.

Moreover, in the OLT and the route switching method according to the present exemplary embodiment, broadcast packets can be stored in a switch queue while route switching is being performed for an ONU. Thus, even when the broadcasting service is provided, ONU route switching may be performed without discarding the broadcast packets.

In more detail, while ONU route switching is performed, the broadcast packets to be transmitted to both the pre-switch OSU and the post-switch OSU are stored in the switch queues, and other broadcast packets can be transmitted to the through queues. Thus, for example, a case in which video of channels 1 to 50 provided from a video delivery server X present at a higher level network is distributed from the first OSU to respective ONUs using the wavelength λ1, video of channels 101 to 150 provided from a video delivery server Y is distributed from the second OSU to respective ONUs using the wavelength λ2, and video of channels 201 to 250 provided from a video delivery server Z is distributed from the first OSU and the second OSU to respective ONUs using the wavelengths λ1 and λ2, and in a case in which a subscriber under the first ONU, currently simultaneously viewing channel 1 and channel 201, issues a request to change from viewing channel 1 to channel 101, viewing may be switched from channel 1 to channel 101 without interrupting viewing of channel 201, which was being viewed up to this time, by switching the connection destination of the first ONU from the first OSU to the second OSU in accordance with the route switching method of the present exemplary embodiment. When this occurs, service provision other than the video delivery service, such as internet data communication and the like, can be continued without being cut off. Moreover, buffers can be utilized effectively since there the broadcast packets are not stored in the switch queues of other than the switch queues that transmit the broadcast packets to both the pre-switch OSU and the post-switch OSU.

In the above described exemplary embodiment, although explanation has been given regarding a case in which a single switch queue is employed for a single switching target ONU, there is no limitation thereto. For example, route switching for plural ONUs having equivalent wavelength switching times may be performed using a single switch queue.

Moreover, in the above described exemplary embodiment, although explanation has been given regarding a case in which the OLT and the route switching method according to the present disclosure are applied to a TWDM-PON, there is no limitation thereto. The OLT and the route switching method according to the present disclosure may also be applied to route switching in general networks for load distribution and for switching without disconnection to a redundant route in the event of a failure.

Figure 4:
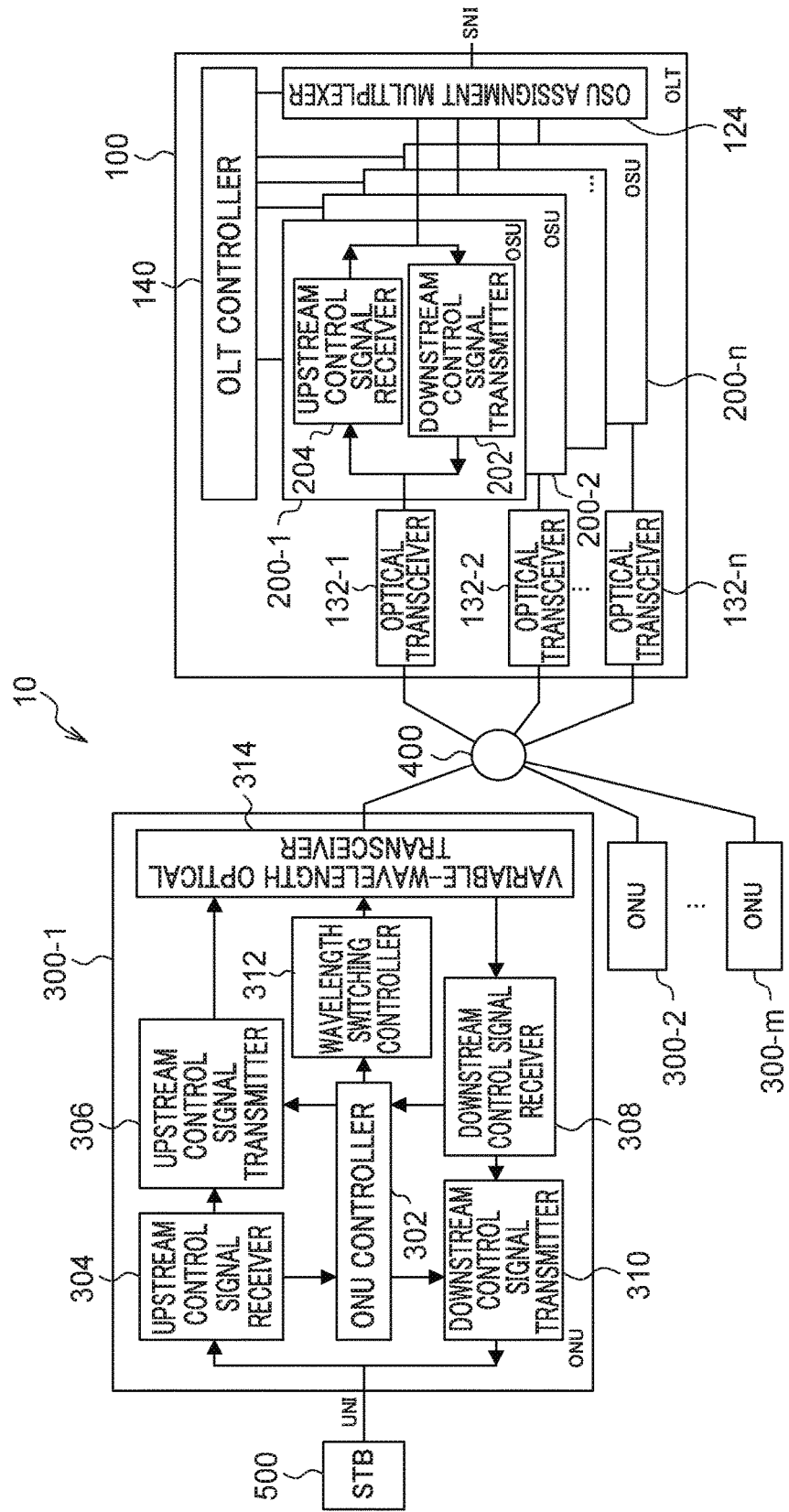
FIG. 4 is a diagram of configuration of a TWDM-PON for explaining a wavelength switching method according to an exemplary embodiment.
Figure 5:
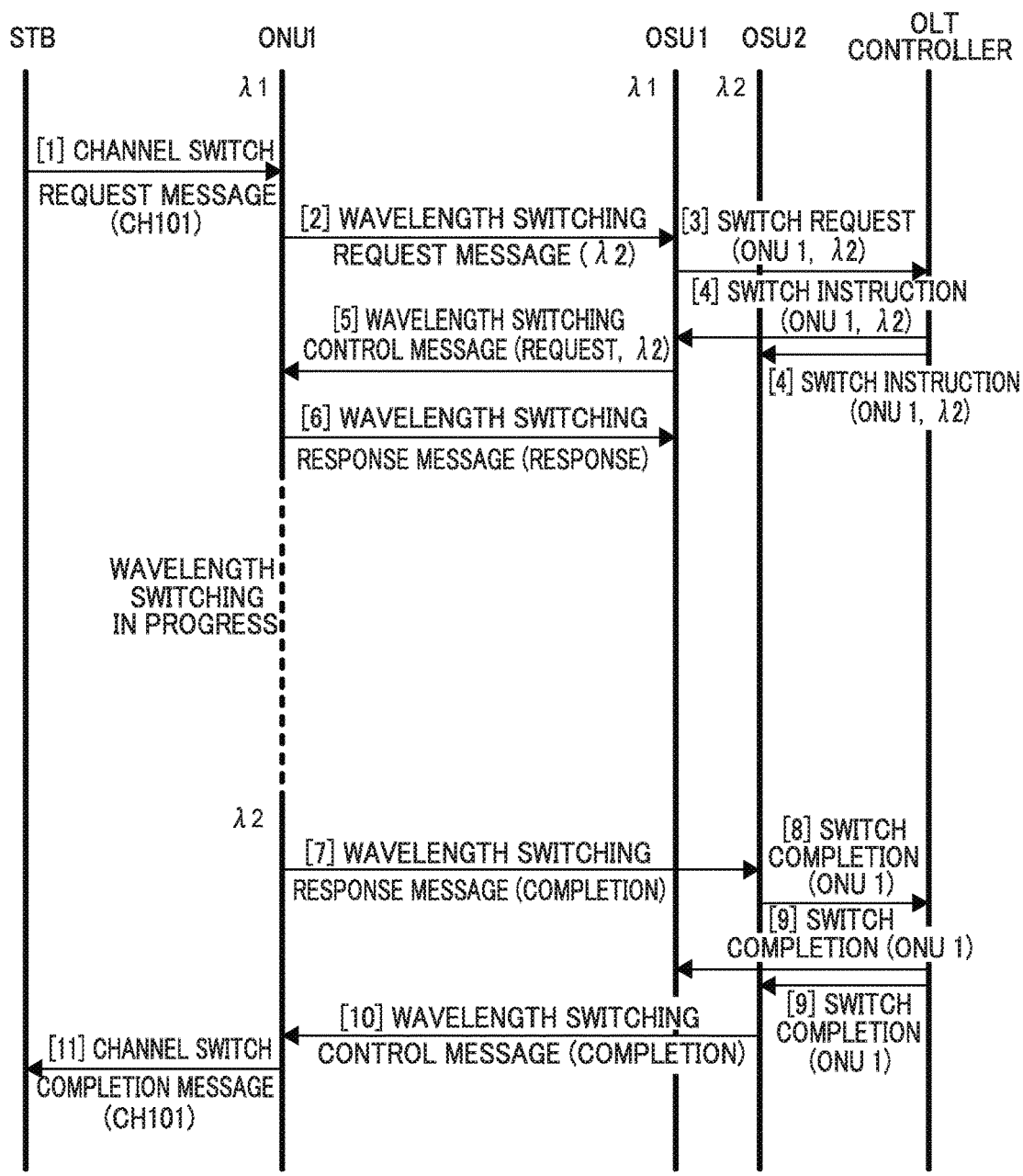
FIG. 5 is a sequence diagram for explaining a wavelength switching method according to an exemplary embodiment.
Figure 6:
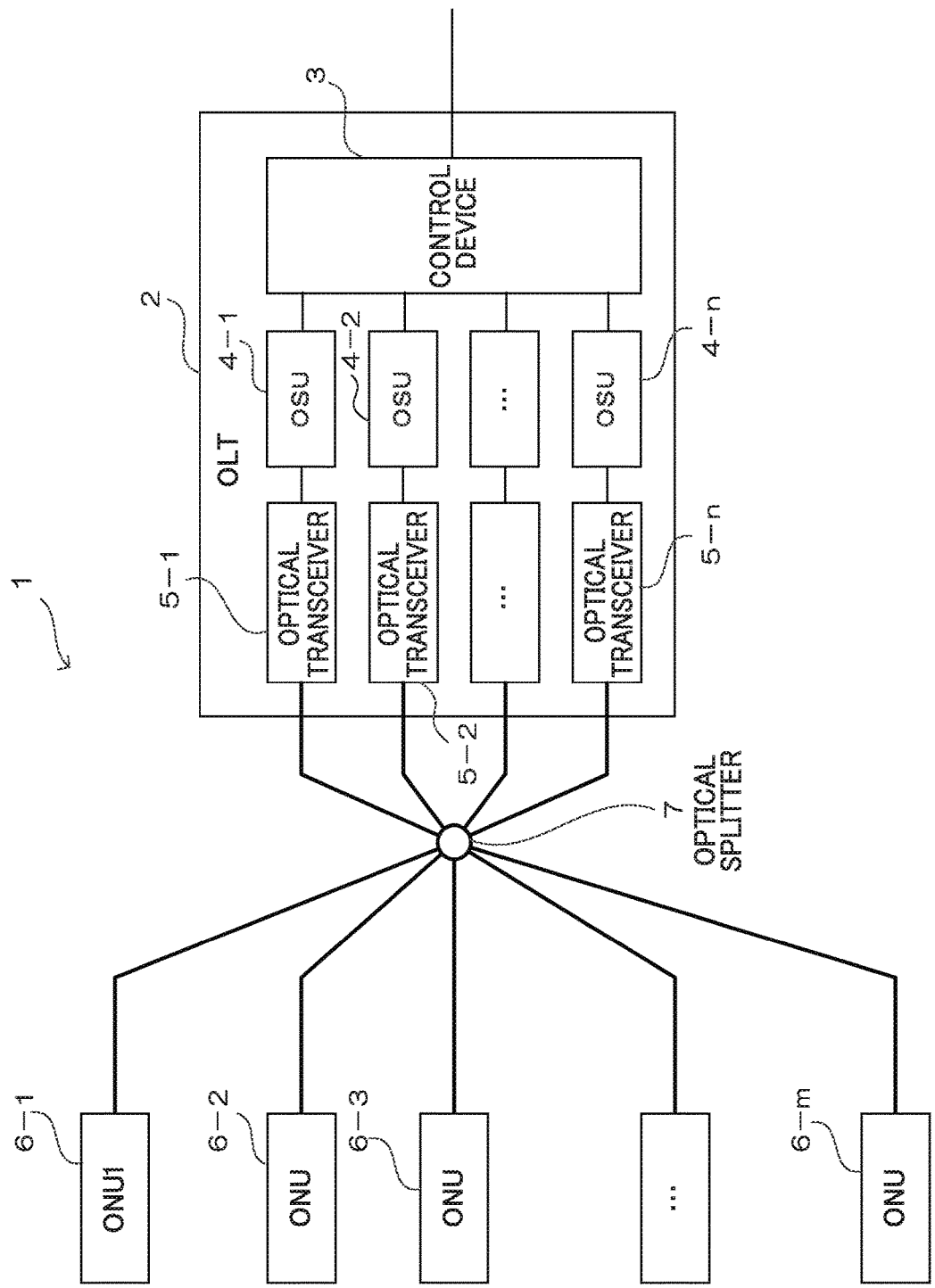
FIG. 6 is a configuration diagram for explaining a conventional TWDM-PON.

Next, explanation follows regarding the wavelength switching method according to the present exemplary embodiment, with reference to FIG. 4 and FIG. 5. The wavelength switching method explained below is a configuration in which wavelength switching is executed at the discretion of an ONU based on a request from the ONU.

In the route switching method described above, there are no particular limitations to the cause, the origin etc. of the switch request, and the route switching and the wavelength switching method accompanying the route switching may be commonly applied with the objective of distributing load according to variation in traffic, the objective of route switching in the event of a failure, or the like. The present exemplary embodiment is an example configuration in which the route switching is executed based on a request from the ONU, serving as one out of many examples of such route switching. The following explanation mainly focuses on the wavelength switching method according to the present exemplary embodiment. Specific procedures for route switching without disconnection employing respective queues are similar to the above, and explanation thereof will be omitted.

FIG. 4 is a diagram of configuration of the TWDM-PON 10 for explaining the wavelength switching method according to the present exemplary embodiment. PON systems generally require function of transmitting and receiving, between the OLT and the ONUs, control information for establishing communication routes between the OLT and the ONUs, and upstream data transmission control information after the establishment of a communication route. However, explanation is only given here regarding functionality needed for wavelength switching control.

The OLT 100 is configured including an OSU assignment multiplexer 124, plural optical transceivers 132 (132-1 to 132-n), the plural OSUs 200 (200-1 to 200-n), and the OLT controller 140. The respective optical transceivers 132 are one-to-one connected to the respective OSUs 200, and signals output from the OSU 200-1 are output using the transmission wavelength allocated to the optical transceiver 132-1 so as to be input to the optical transceiver 132-1. Out of optical signals input to the optical transceiver 132-1, only optical signals of the reception wavelength allocated to the optical transceiver 132-1 are received, and are output to the OSU 200-1 after conversion to an electrical signal.

The OSU assignment multiplexer 124 identifies which ONU is addressed as the destination of data input from the SNI, identifies which OSU the addressed ONU is connected to, and assigns the data to be output to that OSU. Namely, the OSU assignment multiplexer 124 combines the functionality of the LLID identification section 110 and the functionality of the OSU assignment section 120 of FIG. 2. For example, when the input data is video delivery data, the OSU to which that data is to be distributed is identified, and the data is assigned to be output to that OSU. Moreover, upstream data output from each OSU is multiplexed and output to the SNI.

The OSU 200 is configured including a downstream control signal transmitter 202 and an upstream control signal receiver 204.

Based on a switching instruction notification from the OLT controller 140, the downstream control signal transmitter 202 generates a wavelength switching control message, multiplexes the generated wavelength switching control message with data output from the OSU assignment multiplexer 124, and outputs the multiplexed wavelength switching control message and data to the optical transceiver 132. The upstream control signal receiver 204 receives signals output from the optical transceiver 132, extracts wavelength switching request messages from the received data, and notifies switch requests to the OLT controller 140. Wavelength switching response messages are also extracted from the received data and switch completions are notified to the OLT controller 140. Other data is output to the OSU assignment multiplexer 124.

The OLT controller 140 manages allocation of wavelengths to each of the ONUs 300, and executes wavelength switching control by transmitting and receiving wavelength switching control messages, wavelength switching response messages, and wavelength switching request messages, via the downstream control signal transmitter 202 and the upstream control signal receiver 204, to and from the ONU 300.

The ONU 300 is configured including an upstream control signal receiver 304, an upstream control signal transmitter 306, a downstream control signal receiver 308, a downstream control signal transmitter 310, an ONU controller 302, a wavelength switching controller 312, and a variable-wavelength optical transceiver 314.

The upstream control signal receiver 304 extracts channel switch request messages from a step top box (STB) 500, input through a user network interface (UNI), and notifies channel switch request messages to the ONU controller 302. Other data is output to the upstream control signal transmitter 306.

Based on instruction by the ONU controller 302, the upstream control signal transmitter 306 generates a wavelength switching response message and a wavelength switching request message, multiplexes the generated wavelength switching response message and wavelength switching request message with data output from the upstream control signal receiver 304, and outputs the multiplexed wavelength switching response message, wavelength switching request message, and data to the variable-wavelength optical transceiver 314.

The downstream control signal receiver 308 receives signals output from the variable-wavelength optical transceiver 314, extracts wavelength switching control messages from the received data, and notifies the extracted wavelength switching control messages to the ONU controller 302. Other data is output to the downstream control signal transmitter 310.

Based on instruction by the ONU controller 302, the downstream control signal transmitter 310 generates a channel switch completion message, multiplexes the channel switch completion message with data output from the downstream control signal receiver 308, and outputs the multiplexed channel switch completion message and data to the UNI.

When the ONU controller 302 has received a wavelength switching control message from the OLT 100 indicating a switch request, the ONU controller 302 notifies the designated wavelength to the wavelength switching controller 312. Moreover, after the wavelength switching by the wavelength switching controller 312 has completed, a wavelength switching response message is notified to the OLT 100 via the upstream control signal transmitter 306. When a channel switch request message has been received from the STB 500, the wavelength to switch to is obtained from analysis of the requested channel number, and a wavelength switching request message including wavelength information requesting the switch is notified to the OLT 100, via the upstream control signal transmitter 306. Moreover, when a wavelength switching control message indicating that switching has completed has been received from the OLT 100, a channel switch completion message is notified to the STB 500, via the downstream control signal transmitter 310.

The wavelength switching controller 312 performs wavelength setting control of the variable-wavelength optical transceiver 314 such that the operating wavelength of the variable-wavelength optical transceiver 314 becomes the wavelength notified by the ONU controller 302. Signals output from the upstream control signal transmitter 306 are output by the variable-wavelength optical transceiver 314 using the upstream wavelength controlled by the wavelength switching controller 312. Moreover, from optical signals input to the variable-wavelength optical transceiver 314, only optical signals of the downstream wavelength controlled by the wavelength switching controller 312 are received, and are output to the downstream control signal receiver 308 after conversion to electrical signals.

Each of the optical transceivers 132 of the OLT 100 is connected, via the optical splitter 400, to each of the variable-wavelength optical transceivers 314 of the ONU 300.

Next, explanation follows regarding a wavelength switching sequence of the wavelength switching method according to the present exemplary embodiment, with reference to FIG. 5. Herein, the OSU 200-1 is set to wavelength $\lambda 1$ and the OSU 200-2 is set to wavelength $\lambda 2$, and video of ch1 to ch100 is distributed using wavelength $2\lambda$ and video of ch101 to ch200 is distributed using wavelength $\lambda 2$. Explanation follows regarding a case in which a subscriber under the ONU 300-1 has issued a viewing request for ch101 to the STB 500, in a state in which the ONU 300-1 is connected to the OSU 200-1. In the following explanation, reference to [1] etc. corresponds to labels [1] etc. in FIG. 5. Moreover, in the following explanation, the ONU 300-1 is denoted ONU 1, the OSU 200-1 is denoted OSU 1, and the OSU 200-2 is denoted OSU 2.

The subscriber under the ONU 1 issues the STB 500 with a viewing request for ch101, and the STB 500 transmits [1] a channel switch request message (ch101) to the ONU 1.

After receiving [1] the channel switch request message (ch101) via the upstream control signal receiver 304, the ONU controller 302 of the ONU 1 analyses which wavelength the channel requested by the switch belongs to. In this case, [2] a wavelength switching request message (λ2) is transmitted to the OSU 1 via the upstream control signal transmitter 306, since the result of the analysis is λ2, which does not match the current wavelength, λ1, of the ONU 1. In cases in which the result of the analysis matches the current wavelength of the ONU 1, the channel switch completion message (ch101) is notified to the STB 500, without the wavelength switching request message being transmitted.

After receiving [2] the wavelength switching request message (λ2), the upstream control signal receiver 204 of the OSU 1 notifies [3] a switch request (ONU 1, λ2) to the OLT controller 140.

After receiving [3] the switch request (ONU 1, λ2), the OLT controller 140 notifies [4] a switch instruction (ONU 1, λ2) to the OSU 1 and the OSU 2.

After receiving [4] the switch instruction (ONU 1, λ2), the OSU 1 transmits from the downstream control signal transmitter 202 [5] a wavelength switching control message (request, λ2) to the addressed ONU 1, and, although this is not illustrated in FIG. 5, also periodically transmits authorization for wavelength switching response messages from the downstream control signal transmitter 202 to the ONU 1. Note that "authorization" refers to a signal indicating that transmission is permitted.

Although this is not illustrated in FIG. 5, after receiving [4] the switch instruction (ONU 1, λ2), the OSU 2 periodically transmits authorization for wavelength switching response messages to the ONU 1.

After receiving [5] the wavelength switching control message (request, λ2) via the upstream control signal transmitter 306, the ONU controller 302 of the ONU 1 transmits [6] a wavelength switching response message (response) to the OSU 1, and also instructs the wavelength switching controller 312 to switch the wavelength to wavelength λ2 in accordance with the instruction of the wavelength switching control message (request, λ2). The wavelength switching controller 312 changes the wavelength of the variable-wavelength optical transceiver 314 to λ2.

When the wavelength switching of the variable-wavelength optical transceiver 314 has completed and the ONU 1, which has changed its wavelength to λ2, receives an authorization for a wavelength switching response message from the OSU 2, [7] a wavelength switching response message (completion) is transmitted to the OSU 2 via the upstream control signal transmitter 306.

After receiving [7] the wavelength switching response message (completion), the OSU 2 notifies [8] a switch completion (ONU 1) to the OLT controller 140.

After receiving [8] the switch completion (ONU 1), the OLT controller 140 notifies [9] the switch completion (ONU 1) to the OSU 1 and the OSU 2.

After receiving [9] a switch completion (ONU 1), the OSU 2 transmits [10] a wavelength switching control message (completion) from the downstream control signal transmitter 202 to the ONU 1, and stops transmitting the authorization for a wavelength switching response message to the ONU 1. Similarly, after receiving [9] the switch completion (ONU 1), the OSU 1 stops the authorization for a wavelength switching response message to the ONU 1.

After receiving [10] the wavelength switching control message (completion), the ONU 1 notifies [11] a channel switch completion (ch101) to the STB 500.

After receiving [11] the channel switch completion (ch101), the STB 500 changes the channel to 101 and receives video.

By executing the wavelength switching procedure described above, in a TWDM-PON system that provides a multi-channel 4K video delivery service by wavelength, a video channel distributed using a different wavelength can be received using a viewing request from a subscriber under an ONU as a trigger, without other services such as data communication received up to that time being suspended.

The relationship between the wavelength switching sequence illustrated in FIG. 5 and the timing chart of the route switching illustrated in FIG. 3 is as follows. Transmission of the control packets XS in FIG. 3 corresponds to [5] the wavelength switching control message (request, λ2) in FIG. 5, and the time point when the wavelength switching has completed at moment VI in FIG. 3 corresponds to the transmission time point of [9] the switch completion (ONU 1) in FIG. 5. Accordingly, [1] the channel switch request message (ch101) to [4] the switch instruction (ONU 1, λ2) in FIG. 5 is transmitted in a duration in FIG. 3 from moment I to moment II.

As described in detail above, in the wavelength switching method according to the present exemplary embodiment, wavelength switching control of the ONUs may not only be implemented at the discretion of the OLT as wavelength switching control by control from the OLT, but may also be started at the discretion of the ONU by wavelength switching control based on the request from the ONU. Thus, in the TWDM-PON system that provides video delivery services so as to distribute different channel groups using respective wavelengths, for example, even when the subscriber under an ONU wishes to receive a channel provided by a different wavelength from the wavelength of the ONU at that time, the desired video channel may be received by notification of a wavelength switching request from the ONU, without other services such as data communication received up to that time being suspended.

Although wavelength switching request messages are transmitted with viewing requests from a subscriber serving as a trigger in the exemplary embodiment described above, the cause of wavelength switching request message transmission from the ONU is not limited thereto. Moreover, although explanation has been given regarding an example of a wavelength switching between the OSU 1 and the OSU 2, the switch combination is not limited thereto. Moreover, although the wavelength switching operation has been described for the ONU 1 alone, wavelength switching by plural ONUs may be implemented simultaneously.

What is claimed is:

1. A station side terminal device comprising:
   terminal devices each including:
      a buffer section including a through queue and one or more switch queues that temporarily store the packets;
      a subscriber side terminal device assignment section that, in cases in which route switching has occurred in a communication route that connects the station side terminal device and subscriber side terminal devices, causes unicast packets addressed to switching target subscriber side terminal devices and packets for switching targets that are addressed to all of the subscriber side terminal devices to be stored in one of the one or more switch queues, and causes unicast packets addressed to non-switching target subscriber side terminal devices and packets for non-switching targets that are addressed to all of the subscriber side terminal devices to be stored in the through queue; and a scheduler that reads packets that have been stored in the buffer section, and outputs the read packets to the connected subscriber side terminal device; and a terminal device assignment section that transmits the unicast packets, which are obtained from a higher level communication network to which the station side terminal device is connected, to a terminal device in which a subscriber side terminal device is registered as a destination of the unicast packets, and copies the packets addressed to all of the subscriber side terminal devices obtained from the higher level communication network and transmits the copied packets to one or more designated terminal devices.

2. The station side terminal device of claim 1, wherein, in a case in which the terminal device, in which the switching target subscriber side terminal device is registered, is changed by the route switching from a pre-switching terminal device to a post-switching terminal device, the terminal device assignment section changes a transmit destination of the unicast packets addressed to the switching target subscriber side terminal devices from the pre-switching terminal device to the post-switching terminal device, and, among the packets that are addressed to all of the subscriber side terminal devices, marks packets that are to be transmitted to both the pre-switching terminal device and the post-switching terminal device as the packets for switching targets that are addressed to all of the subscriber side terminal devices.

3. The station side terminal device of claim 1, wherein the subscriber side terminal device assignment section:

determines a storing destination queue by referring to a learning table that associates the switching target subscriber side terminal devices with the switch queues, and that associates the packets for switching targets that are addressed to all of the subscriber side terminal devices with the switch queues;

in cases in which the destinations of the unicast packets are the non-switching target subscriber side terminal devices, stores the unicast packets in the through queue;

in cases in which the destinations of the unicast packets are the switching target subscriber side terminal devices and the switch queues for storing the unicast packets are registered in the learning table, stores the unicast packets in the registered switch queues;

in cases in which the destinations of the unicast packets are the switching target subscriber side terminal devices and there is no switch queue registered in the learning table for storing the unicast packets, stores the unicast packets in one of non-used switch queues, and registers the one of the switch queues in the learning table;

in cases in which the packets are addressed to all of the subscriber side terminal devices and neither a pre-switching terminal device nor a post-switching terminal device of the switching target subscriber side terminal devices is included in one or more terminal devices designated as a destination of the packets, sets the packets addressed to all of the subscriber side terminal devices as non-switching targets and stores the packets in the through queue;

in cases in which the packets are addressed to all of the subscriber side terminal devices and both a pre-switching terminal device and a post-switching terminal device of the switching target subscriber side terminal device are included in one or more terminal devices designated as a destination of the packets, and the switch queues for storing the packets are registered in the learning table, sets the packets addressed to all of the subscriber side terminal devices as switching targets and stores the packets in the registered switch queues; and in cases in which the packets are addressed to all of the subscriber side terminal devices and both a pre-switching terminal device and a post-switching terminal device of the switching target subscriber side terminal devices are included in one or more terminal devices designated as a destination of the packets, and the switch queues for storing the packets are not registered in the learning table, sets the packets addressed to all of the subscriber side terminal devices as switching targets, stores the packets in one of the non-used switch queues, and registers the one of the switch queues in the learning table.

4. The station side terminal device of claim 1, wherein a number of the switch queues is fewer than a number of the subscriber side terminal devices that can be registered in a terminal device.

5. The station side terminal device of claim 1, wherein a number of the subscriber side terminal devices in which the route switching is simultaneously executed is fewer than a number of the switch queues.

6. The station side terminal device of claim 1, wherein:

the terminal device assignment section:

determines a transmit destination terminal device for the obtained unicast packets by referring to a first table that associates a subscriber side terminal device with the terminal device in which the subscriber side terminal device is registered, and determines one or more transmit destination terminal devices for the obtained packets addressed to all of the subscriber side terminal devices by referring to a second table that designates a transmit destination of the packets addressed to all of the subscriber side terminal devices; and the station side terminal device further comprises a station side terminal device controller that instructs a pre-switching terminal device to remove the switching target subscriber side terminal devices from registration in the pre-switching terminal device, that instructs a post-switching terminal device to register the switching target subscriber side terminal devices in the post-switching terminal device, and that updates the first table.

7. A route switching method that, in the station side terminal device of claim 1, changes a registration location for the switching target subscriber side terminal devices from a pre-switching terminal device to a post-switching terminal device, the route switching method comprising:

changing, by the terminal device assignment section, a transmit destination of the unicast packets addressed to the switching target subscriber side terminal devices from the pre-switching terminal device to the post-switching terminal device;

referencing, by the subscriber side terminal device assignment section provided at the post-switching terminal device, a learning table, and, in cases in which the switch queue has been learned for the unicast packets addressed to the switching target subscriber side terminal devices, storing the unicast packets addressed to the switching target subscriber side terminal devices in the learned switch queue, in cases in which the switch queue has not been learned for the unicast packets addressed to the switching target subscriber side terminal devices, storing the unicast packets addressed to the switching target subscriber side terminal devices in one of the non-used switch queues, and registering the one of the switch queues in the learning table, in cases in which the switch queue has been learned for the packets for switching targets that are addressed to all of the subscriber side terminal devices, storing the packets for switching targets that are addressed to all of the subscriber side terminal devices in the learned switch queue, and in cases in which the switch queue has not been learned for the packets for switching targets that are addressed to all of the subscriber side terminal devices, storing the packets for switching targets that are addressed to all of the subscriber side terminal devices in one of the non-used switch queues and registering the one of the switch queues in the learning table;

referencing, by the subscriber side terminal device assignment section provided at the pre-switching terminal device, a learning table, and in cases in which the switch queue has been learned for the packets for switching targets that are addressed to all of the subscriber side terminal devices, storing the packets for switching targets that are addressed to all of the subscriber side terminal devices in the learned switch queue, and in cases in which the switch queue has not been learned for the packets for switching targets that are addressed to all of the subscriber side terminal devices, storing the packets for switching targets that are addressed to all of the subscriber side terminal devices in one of the non-used switch queues and registering the one of the switch queues in the learning table;

after a number of the packets addressed to the switching target subscriber side terminal devices stored in the pre-switching terminal device becomes zero, starting, by the post-switching terminal device, transmission of packets addressed to the switching target subscriber side terminal devices, and starting transmission of the packets for switching targets that are addressed to all of the subscriber side terminal devices, and starting, by the pre-switching terminal device, transmission of the packets for switching targets that are addressed to all of the subscriber side terminal devices;

after a number of the unicast packets addressed to the switching target subscriber side terminal devices stored in the switch queue of the post-switching terminal device becomes zero, disassociating the switch queue for the unicast packets addressed to the switching target subscriber side terminal devices from the learning table, and transmitting the unicast packets addressed to the switching target subscriber side terminal devices via the through queue; and after a number of the packets for switching targets that are addressed to all of the subscriber side terminal devices stored in the switch queue of the post-switching terminal device becomes zero, disassociating the switch queue for the packets for switching targets that are addressed to all of the subscriber side terminal devices from the learning table, and transmitting the packets for switching targets that are addressed to all of the subscriber side terminal devices via the through queue.

8. A non-transitory computer readable medium storing a route switching program that causes a computer to execute each step of the route switching method of claim 7.

9. A subscriber side terminal device, connected to any of the terminal devices in the station side terminal device of claim 1, which allocates respective wavelengths for configuring the communication route through an optical fiber transmission path and provides a specific service using the allocated wavelength, the subscriber side terminal device relaying a service to a user terminal according to a wavelength of the connected terminal device by using packets received through the communication route, the subscriber side terminal device comprising:

a specifying section that receives a request for the service from the user terminal, and that specifies a wavelength allocated to the received service;

a transmitter that, in cases in which the wavelength specified by the specifying section requires a change in wavelength, transmits a wavelength switching request message requesting a switch in wavelength to the connected terminal device; and a receiver configured to switch a wavelength to be received through the communication route.

10. An optical communication system, comprising:

the station side terminal device of claim 1;

an optical splitter connected to the station side terminal device by an optical fiber transmission path; and the subscriber side terminal devices of claim 9, each connected to optical fiber transmission paths that are connected to the optical splitter.

11. A wavelength switching method, for the optical communication system of claim 10 in which the station side terminal device further comprises a station side terminal device controller, of changing a wavelength of a switching target subscriber side terminal device that has transmitted the wavelength switching request message, from a wavelength allocated to a pre-wavelength switching terminal device to a wavelength allocated to a post-wavelength switching terminal device, the wavelength switching method comprising:

transmitting, by the station side terminal device controller, a wavelength switching instruction message to a pre-wavelength switching terminal device and to a post-wavelength switching terminal device, in cases in which the pre-wavelength switching terminal device has received the wavelength switching request message;

transmitting, by a pre-switching terminal device that has received the wavelength switching instruction message from the station side terminal device controller, a wavelength switching control message to a switching target subscriber side terminal device;

transmitting, by the switching target subscriber side terminal device that has received the wavelength switching control message, a first wavelength switching completion message to the post-wavelength switching terminal device after the wavelength of the receiver has been switched;

transmitting, by the station side terminal device controller, a first switch completion message to the pre-wavelength switching terminal device and to the post-wavelength switching terminal device, in cases in which the post-wavelength switching terminal device has received the first wavelength switching completion message;

transmitting, by the post-wavelength switching terminal device that has received the first switch completion message, a second wavelength switching completion message to the switching target subscriber side terminal device; and transmitting, by the switching target subscriber side terminal device that has received the second wavelength switching completion message, a second switch completion message to the user terminal.

* * * * *